US011326641B2

(12) United States Patent
Sellers

(10) Patent No.: US 11,326,641 B2
(45) Date of Patent: May 10, 2022

(54) BALL JOINT ASSEMBLY

(71) Applicant: Federal-Mogul Motorparts LLC, Southfield, MI (US)

(72) Inventor: Roger Sellers, Arnold, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 640 days.

(21) Appl. No.: 16/127,370

(22) Filed: Sep. 11, 2018

(65) Prior Publication Data
US 2020/0080590 A1     Mar. 12, 2020

(51) Int. Cl.
*F16C 11/08* (2006.01)
*F16C 11/06* (2006.01)
*B60G 7/00* (2006.01)

(52) U.S. Cl.
CPC ............ *F16C 11/086* (2013.01); *B60G 7/005* (2013.01); *F16C 11/0685* (2013.01); *B60G 2204/416* (2013.01); *Y10T 403/32721* (2015.01)

(58) Field of Classification Search
CPC .............. F16C 11/0623; F16C 11/0628; F16C 11/0633; F16C 11/0638; F16C 11/0647; F16C 11/08; F16C 11/083; F16C 11/086; F16C 11/0685; Y10T 403/32713; Y10T 403/32721; Y10T 403/32737; Y10T 403/32762; B60G 7/005; B60G 2204/416
USPC ....................................................... 403/133
See application file for complete search history.

(56) References Cited

U.S. PATENT DOCUMENTS

| 3,451,701 A | * | 6/1969 | Smith | ...................... B62D 7/16 403/140 |
| 3,578,366 A | * | 5/1971 | Snidar | ................. F16C 11/0671 403/140 |
| 4,003,666 A | * | 1/1977 | Gaines | .................. F16C 11/068 403/36 |
| 4,003,667 A | * | 1/1977 | Gaines | .................. F16C 11/068 403/36 |
| 4,076,344 A | * | 2/1978 | Gaines | ................ F16C 11/0638 384/213 |

(Continued)

FOREIGN PATENT DOCUMENTS

| DE | 7315899 U | 10/1974 | |
| FR | 2885188 A1 | * 11/2006 | .......... F16C 11/0638 |
| GB | 2033955 A | * 5/1980 | .......... F16C 11/0666 |

OTHER PUBLICATIONS

International Search Report, dated Nov. 29, 2019 (PCT/US2019/050505).

*Primary Examiner* — Amber R Anderson
*Assistant Examiner* — Kevin J Baynes
(74) *Attorney, Agent, or Firm* — Robert L. Stearns; Dickinson Wright, PLLC

(57) ABSTRACT

The ball joint assembly includes a housing with an inner wall which surrounds an inner bore that extends along a central axis. The ball joint assembly further includes a ball stud with a ball portion and a shank portion. The ball portion is received in the inner bore of the housing, and the shank portion projects out of the inner bore through an open end of the housing. First and second preload members are disposed in the inner bore on opposite axial sides of the ball portion and are in contact with the ball portion. The preload members are of an elastomeric material. At least one of the preload members is compressed to urge the ball portion to a central location.

15 Claims, 8 Drawing Sheets

(56) References Cited

U.S. PATENT DOCUMENTS

| | | | | |
|---|---|---|---|---|
| 4,331,367 | A * | 5/1982 | Trudeau | F16C 33/22 |
| | | | | 384/202 |
| 4,386,869 | A * | 6/1983 | Smith | F16C 11/0652 |
| | | | | 403/39 |
| 4,447,094 | A * | 5/1984 | Trudeau | F16C 11/0666 |
| | | | | 384/145 |
| 4,714,368 | A * | 12/1987 | Sawada | F16C 11/0614 |
| | | | | 403/132 |
| 4,718,779 | A * | 1/1988 | Trudeau | F16C 33/74 |
| | | | | 384/152 |
| 4,761,083 | A * | 8/1988 | Smith | F16C 39/02 |
| | | | | 384/208 |
| 6,334,713 | B1 * | 1/2002 | Chu | F16J 15/3268 |
| | | | | 384/464 |
| 6,413,003 | B1 | 7/2002 | Schmidt et al. | |
| 6,742,955 | B2 * | 6/2004 | Moses | F16C 11/068 |
| | | | | 403/122 |
| 7,654,766 | B2 * | 2/2010 | Zuge | F16C 11/0614 |
| | | | | 403/145 |
| 7,753,611 | B2 * | 7/2010 | Ergodan | B62D 7/166 |
| | | | | 403/138 |
| 2016/0369837 | A1 * | 12/2016 | Yu | F16C 11/0642 |
| 2019/0309793 | A1 * | 10/2019 | Schmidt | B60D 1/06 |

* cited by examiner

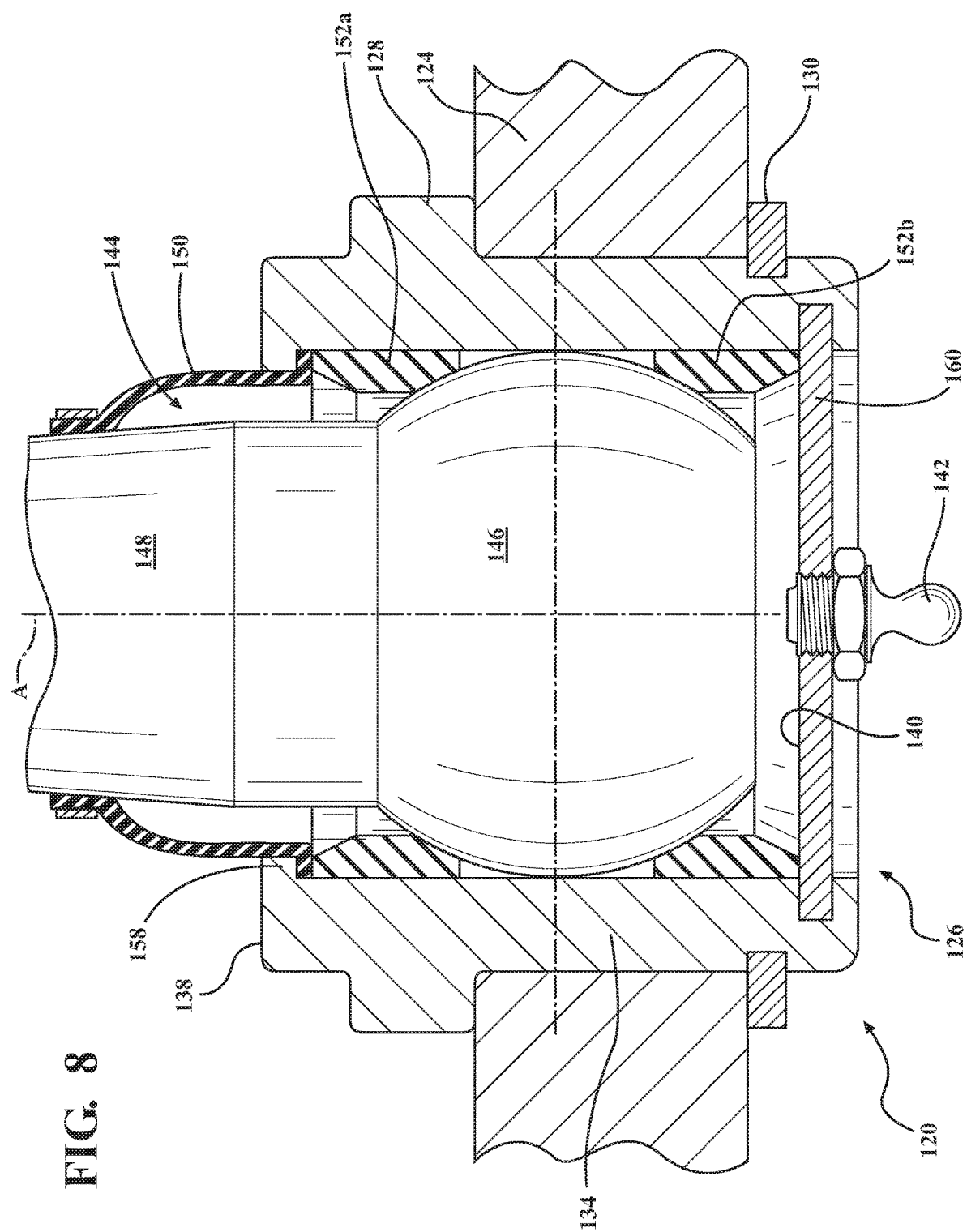

BALL JOINT ASSEMBLY

BACKGROUND OF THE INVENTION

1. Field of the Invention

The present invention relates generally to ball and socket assemblies and more particularly to ball joints for the suspension systems of vehicles.

2. Related Art

In some four wheel drive systems, a pair of ball joints fixedly attach an axle with a knuckle. Each of the ball joints has a housing and a ball stud that can articulate and rotate relative to one another. The housing contains a pair of bearings that are disposed on opposite axial sides of a ball portion of the ball stud for allowing this rotation and articulation. In addition to allowing the ball stud to articulate and rotate, the bearings also generally fix the ball stud with the housing in an axial direction. However, in certain circumstances, such as when the ball joint is improperly installed in the vehicle, this limited axial movement of the ball stud relative to the housing can put the ball joint in a bind. This condition may result in a phenomenon typically known as "memory steer" whereby the vehicle wants to keep turning in a direction after completing a turn in the same direction.

SUMMARY OF THE INVENTION AND ADVANTAGES

One aspect of the present invention is related to a ball joint assembly that includes a housing with an inner wall which surrounds an inner bore that extends along a central axis. The ball joint assembly further includes a ball stud with a ball portion and a shank portion. The ball portion is received in the inner bore of the housing, and the shank portion projects out of the inner bore through an open end of the housing. First and second preload members are disposed in the inner bore on opposite axial sides of the ball portion and are in contact with the ball portion. The preload members are of an elastomeric material. At least one of the preload members is compressed to urge the ball portion to a central location.

The ball joint assembly is advantageous because it allows the ball stud to move relative to the housing in the axial direction without binding up. This is accomplished with minimal (if any) increase in the torque required to articulate or rotate the ball stud relative to the housing and with little to no increase in cost.

According to another aspect of the present invention, the first and second preload members are of identical construction. This configuration allows for manufacturing cost savings through economies of scale.

According to yet another aspect of the present invention, each of the preload members is annular in shape and circles the central axis.

According to still another aspect of the present invention, each of the preload members has a corrugated top with a plurality of peaks and a plurality of valleys, and each of the preload members has a corrugated bottom with a plurality of peaks and a plurality of valleys.

According to a further aspect of the present invention, for each of the preload members, the peaks of the corrugated top are circumferentially aligned with the peaks of the corrugated bottom and the valleys of the corrugated top are circumferentially aligned with the valleys of the corrugated bottom.

According to yet a further aspect of the present invention, each of the preload members has an inner surface which faces towards the central axis, and the inner surface is tapered radially outwardly on the peaks.

According to still a further aspect of the present invention, each of the preload members is made as a monolithic piece of the elastomeric material.

According to another aspect of the present invention, the contact between the preload members and the ball portion of the ball stud is direct contact.

According to yet another aspect of the present invention, the housing is deformed to capture the ball portion of the ball stud and the preload members in the inner bore of the housing.

Another aspect of the present invention is related to a method of making a ball joint assembly. The method includes the step of preparing a housing which has an inner bore and at least one open end. The method continues with the step of inserting a first preload member into the inner bore. The method proceeds with the step of inserting a ball portion of a ball stud into the inner bore such that the shank portion of the ball stud extends out of the inner bore through the at least one open end. The method continues with the step of inserting a second preload member into the inner bore. The method proceeds with the step of compressing at least one of the first and second preload members to impart a biasing force on the ball portion of the ball stud. The method continues with the step of closing the housing to capture the first and second preload members and the ball portion of the ball stud in the inner bore.

According to another aspect of the present invention, the steps of compressing the first and/or second preload members is simultaneous to the step of closing the housing.

According to yet another aspect of the present invention, the step of closing the housing to capture the first and second preload members and the ball portion of the ball stud in the inner bore includes swaging an end of the housing.

According to still another aspect of the present invention, the step of closing the housing to capture the first and second preload members and the ball portion of the ball stud in the inner bore includes engaging a cover plate with the housing.

According to a further aspect of the present invention, each of the first and second preload members is in direct contact with the ball portion of the ball stud.

According to yet a further aspect of the present invention, each of the preload members has a corrugated top and a corrugated bottom.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

FIG. 8 is a fragmentary view of an alternate embodiment of the ball joint assembly in an installed condition and showing a ball stud and a Zerk fitting in elevation and the remaining components in cross-section.

DETAILED DESCRIPTION OF THE ENABLING EMBODIMENTS

Figure 1:
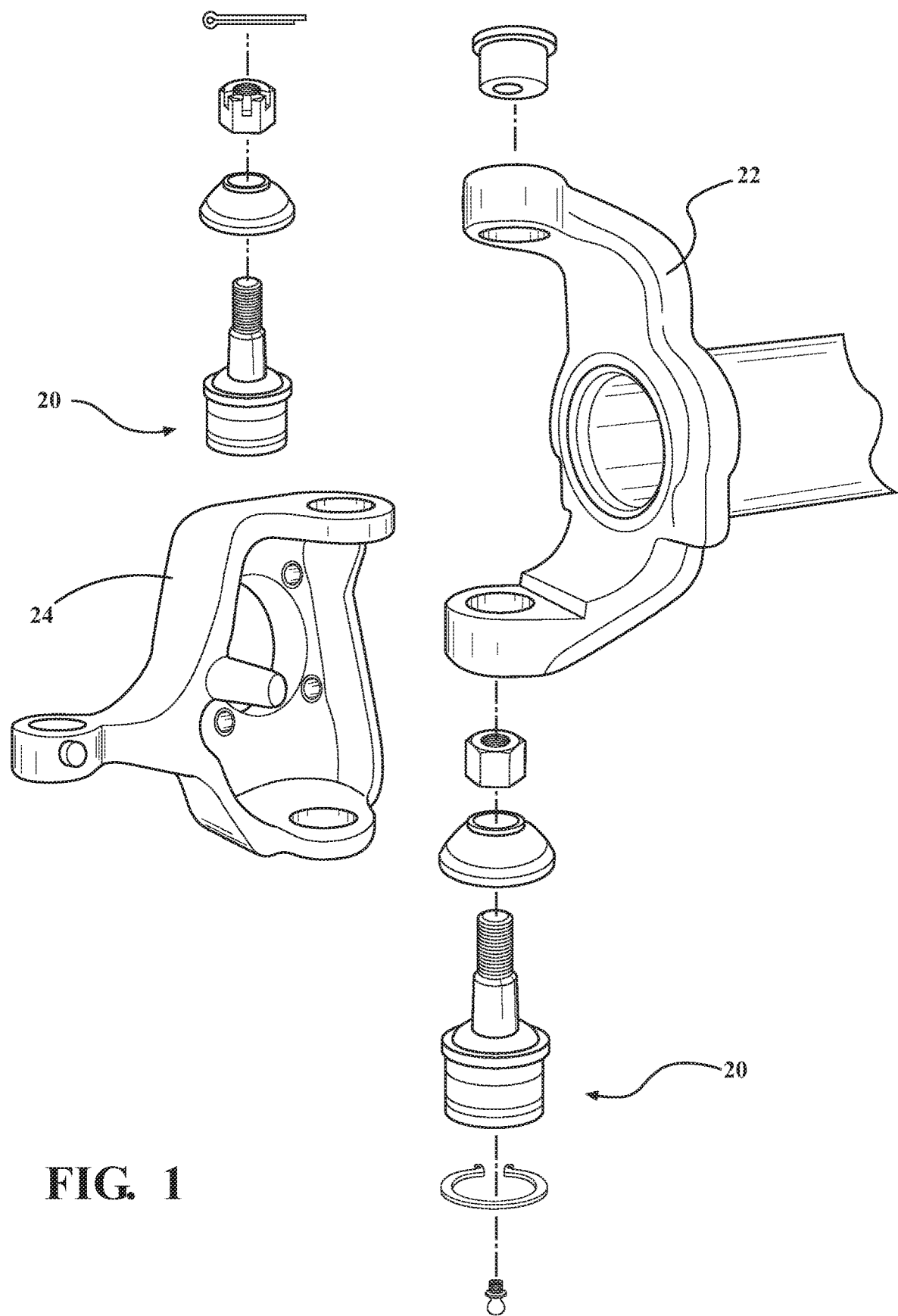
FIG. 1 is an exploded view of an exemplary vehicle suspension assembly including a pair of ball joint assemblies constructed according to one aspect of the present invention.

Referring to the Figures, wherein like numerals indicate corresponding parts throughout the several views, a vehicle suspension system which includes an exemplary pair of ball joint assemblies 20 constructed in accordance with one aspect of the present invention is generally shown in FIG. 1. As shown, the exemplary ball joint assemblies 20 are configured for operably connecting an axle 22 with a knuckle 24 to maintain the knuckle 24 at a predetermined fixed angle relative to the axle 22.

Figure 2:
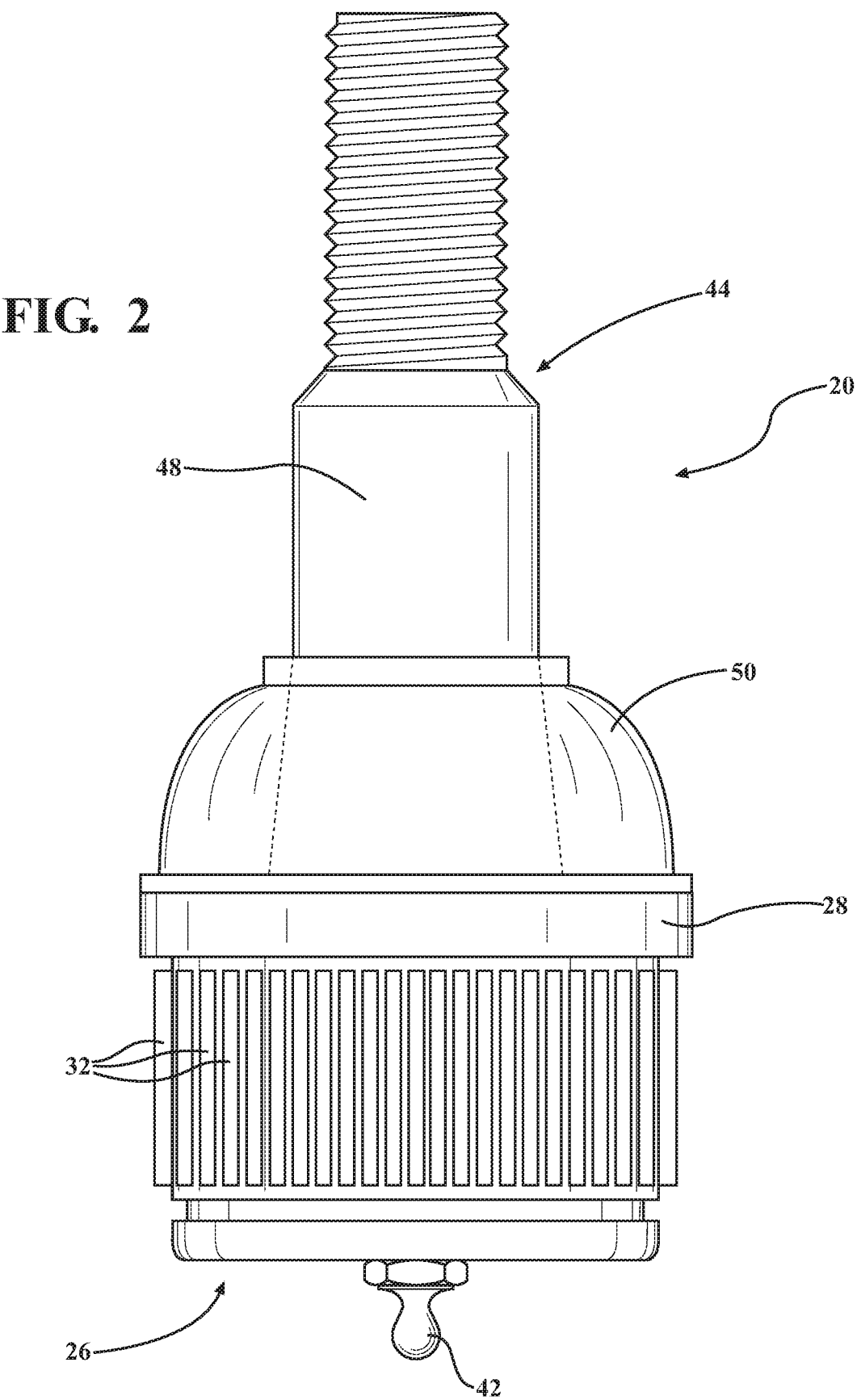
FIG. 2 is a front elevation view of a first exemplary embodiment of a ball joint assembly constructed according to one aspect of the present invention.
Figure 3:
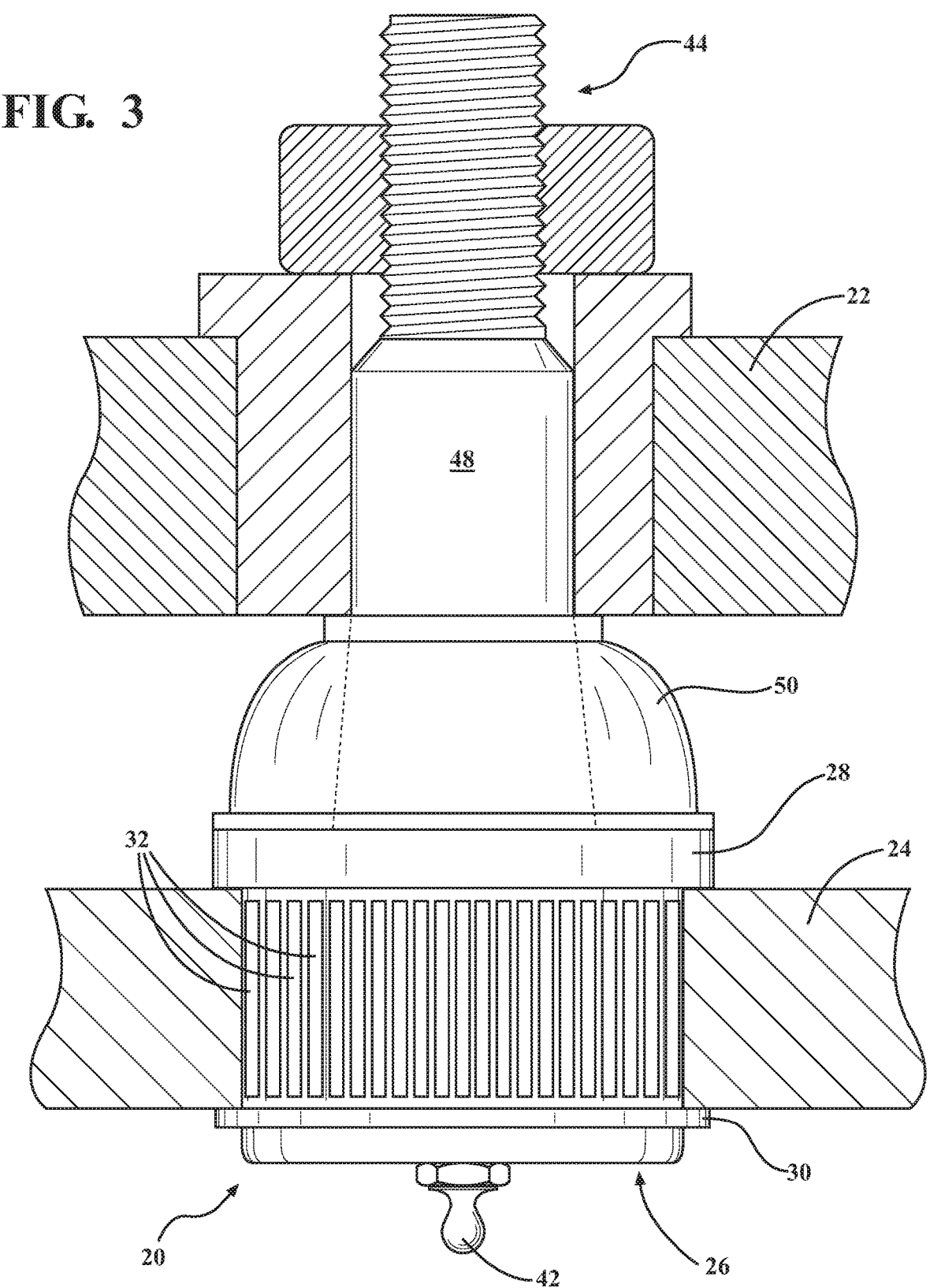
FIG. 3 is a view of the ball joint assembly of FIG. 2 in an installed condition with the ball joint assembly being in elevation and the remaining components being in cross-section.

Referring now to FIGS. 2 and 3, in the exemplary embodiment, the ball joint assembly 20 is of a cartridge-style construction in that it has a housing 26 which is configured to be press-fit into a first opening on the axle 22 or the knuckle 24. The housing 26 has an outer wall that has a radially outwardly extending flange 28 which defines a stopping point for press-fitting the housing 26 into the first opening of the axle 22 or knuckle 24. The outer wall also presents a circumferentially extending groove which is spaced axially from the radially outwardly extending flange 28 for receiving a retainer ring 30 which locks the housing with the axle 22 or the knuckle 24. The outer wall of the exemplary housing 26 also has a plurality of circumferentially spaced apart knurls 32 for improving the press-fitting connection between the housing 26 and the axle 22 or knuckle 24.

Figure 4:
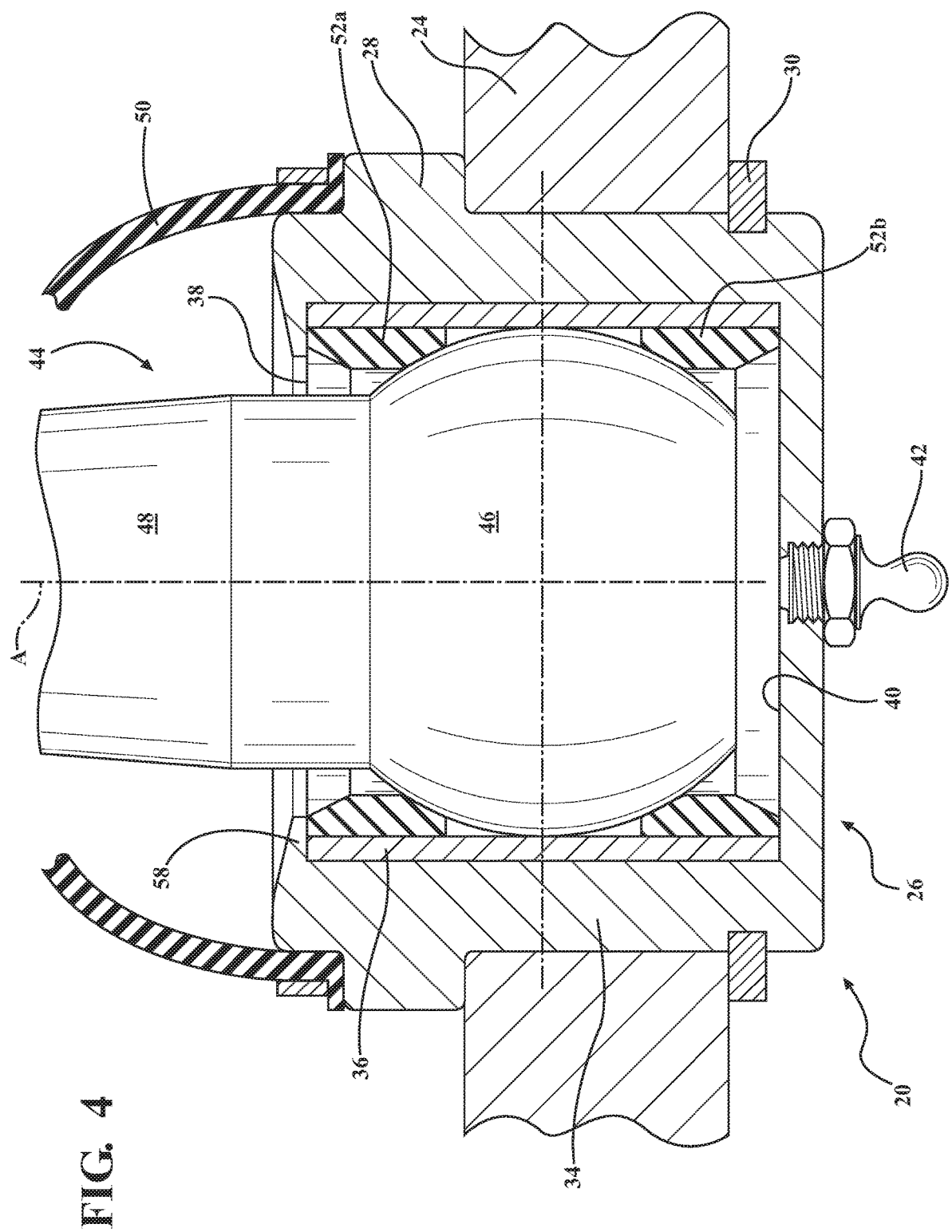
FIG. 4 is a fragmentary view of the ball joint assembly of FIG. 2 in an installed condition and showing a ball stud and a Zerk fitting in elevation and the remaining components in cross-section.

Referring now to FIG. 4, in the first exemplary embodiment of the ball joint assembly 20, the housing 26 is composed of two pieces including a main body piece 34 and a bearing sleeve 36 which is press-fit into an opening of the main body piece 34. The bearing sleeve 36 has an inner wall which surrounds an inner bore that extends along a central axis A from an open first end 38 to a lower wall at a closed second end 40. In this embodiment, the inner wall has a cylindrical shape in that it has a constant diameter along its axial length. The lower wall presents a lubricant opening which receives a Zerk fitting 42 for conveying a lubricant (such as grease) into the inner bore of the housing 26 both during initial assembly and routine maintenance of the ball joint assembly 20.

Both the main body piece 34 and the bearing sleeve 36 of the housing 26 are preferably made of metal, such as iron, steel, a steel alloy, aluminum, or an aluminum alloy and are preferably shaped through casting, forging and/or machining. In the first exemplary embodiment, the main body piece 34 is made of non-gas carbonized AISI 1018 steel, and the bearing sleeve 36 is made of gas carbonized AISI 1018 steel, and thus, the bearing sleeve 36 is made of a material that is harder than the material of the main body piece 34 to absorb forces and resist wear while allowing the relatively softer main body piece 34 to be deformed during a swaging operation, which is described in further detail below.

The ball joint assembly 20 further includes a ball stud 44 with a ball portion 46 and a shank portion 48. The ball portion 46 is received in the inner bore of the housing 26, and the shank portion 48 projects out of the housing 26 through the open first end 38 for connection with the axle 22 or the knuckle 24. The ball portion 46 of the ball stud 44 has a semi-spherically curved exterior surface with an outer diameter that is similar to the constant diameter of the inner wall of the housing 26 such that an equator of the ball portion is in direct contact or near contact with the inner wall three hundred and sixty degrees (360°) around the central axis A. This allows radial loads to be directly transferred between the ball stud 44 and the housing 26 during operation of the vehicle. However, the contact between the ball portion 46 and the inner wall is a clearance fit such that the ball stud 44 can move or rotate relative to the housing 26 along the central axis A as the ball joint assembly 20 is installed on the vehicle and during operation of the vehicle. It should also be appreciated that, depending on the orientation of the ball stud 44 when the ball joint assembly 20 is installed on the vehicle, the contact between the ball portion 46 and the inner wall may not be along the equator of the ball portion 46.

Referring back to FIG. 3, a dust boot 50, which is preferably made of an elastomeric material such as rubber, is sealed against the outer wall of the housing 26 and the shank portion 48 of the ball stud 44 to contain the lubricant within and to keep contaminants out of the inner bore. The dust boot 50 may take any suitable configuration and may be sealingly engaged with the housing 26 and the ball stud 44 through any suitable means.

A pair of preload members 52 (a first preload member 52a and a second preload member 52b) are disposed in the inner bore of the housing 26 and are in direct contact with opposite hemispheres of the ball portion 46 of the ball stud 44. The preload members 52a, 52b are of identical construction, thus leading to reduced manufacturing costs through economies of scale. Each of the preload members 52a, 52b has an annular shape which surrounds the central axis A. Each preload member 52a, 52b also has an outer surface, an inner surface, a top surface, and a bottom surface. When installed in the inner bore of the housing 26, the preload members 52a, 52b are in clearance fit relationships with the bearing sleeve 36.

Figure 7:
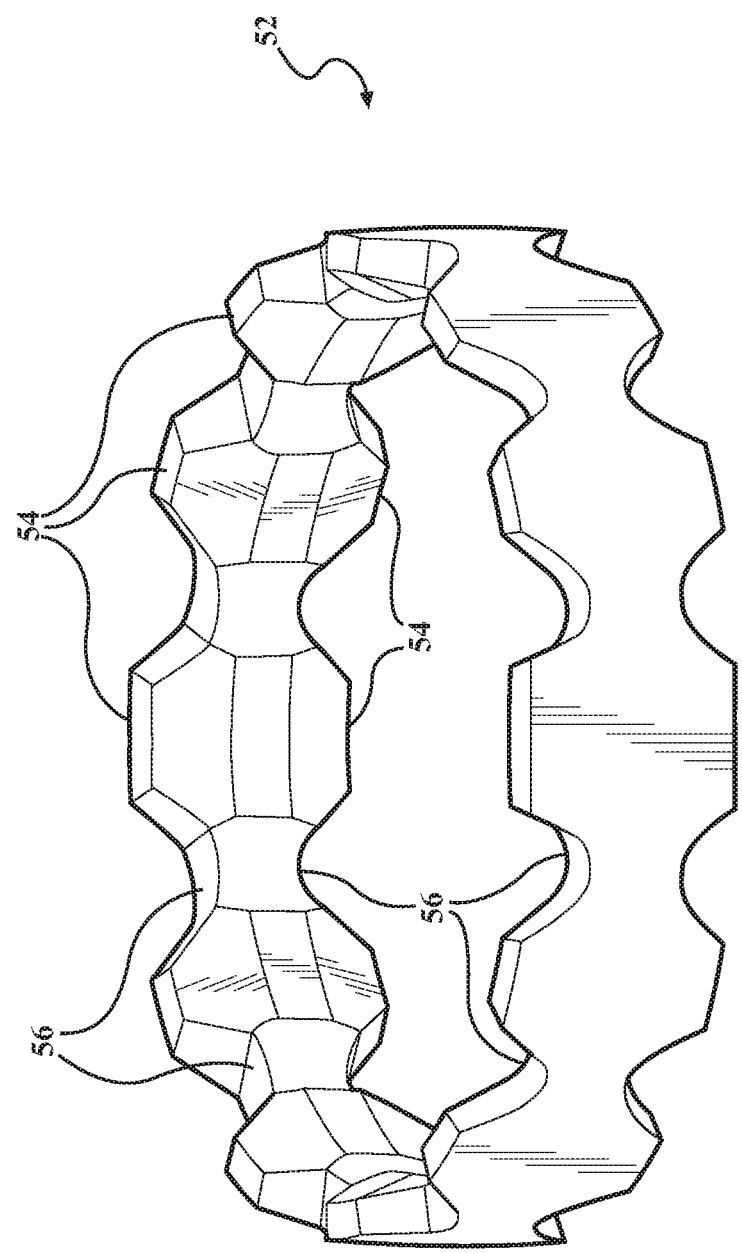
FIG. 7 is a perspective view of a preload member of the ball joint assembly of FIG. 2.

FIG. 7 shows an exemplary one of the preload members 52. As shown, the preload member 52 is symmetrical about a midplane that extends perpendicular to the central axis A. That is, the area of the preload member 52 above the midplane is a mirror image of the area below the midplane. This simplifies the process of assembling the ball joint assembly 20 since the preload members 52 can be installed into the ball socket assembly 20 in either orientation, i.e., either side of the preload member 52 could be the top and either side could be the bottom.

The top and bottom surfaces of the preload member 52 are each corrugated (i.e., castellated) with a plurality of peaks 54 and a plurality of valleys 56. The valleys 56 separate adjacent peaks 54 from one another around the preload member 52. The peaks 54 on the corrugated top are circumferentially aligned with the peaks 54 on the corrugated bottom such that the preload member 52 has a greater height in the areas of the peaks 54 as compared to the areas of the valleys 56. Each preload member 52 also has an increased thickness in the areas of the peaks 54 and a reduced thickness in the areas of the valleys 56. The inner surface is tapered radially outwardly on the peaks 54. That is, in each of the areas with the peaks 54, the inner surface extends parallel to the central axis A at the midplane. The inner surface then tapers radially outwardly in both axial directions, i.e., towards the top in one direction and towards the bottom in an opposite direction. As shown in FIG. 4, in the ball joint assembly 20, the tapered areas of the preload members 52 are in direct contact with opposite hemispheres of the ball portion 46 of the ball stud 44.

In the first exemplary embodiment of the ball joint assembly 20, a top edge of the housing adjacent the open first end 38 of the inner bore is deformed (for example, through swaging) to present a radially inwardly extending lip 58 which partially closes the open first end 38 to capture the bearing sleeve 36; the first and second preload members 52a, 52b; and the ball portion 46 of the ball stud 44 in the inner bore. After the swaging operation is completed, the bearing sleeve 36 extends in the axial direction a fixed length from the lower wall to the lip 58 of the housing 26.

The first and second preload members 52a, 52b are spaced axially from one another within the inner bore of the housing 26 by a gap, and the contact between the ball portion 46 of the ball stud 44 housing 26 occurs within this gap. The exterior surface of the ball portion 46 of the ball stud 44 may be provided with one or more lubricant grooves (not shown) for improving the flow of lubrication within the inner bore.

Each preload member 52 is made as a monolithic piece of an elastomeric material, such as rubber, for biasing the ball portion 46 of the ball stud 44 into a central location within the inner bore (FIG. 4 shows the ball portion 46 in the central location). This is accomplished with minimum increase in the torque required to articulate and rotate the ball stud 44 relative to the housing 26. Lubricant in the inner bore is able to freely cross the preload members 52 in the areas of the valleys 56 where the preload members 52 have a reduced thickness and a reduced height.

Figure 5:
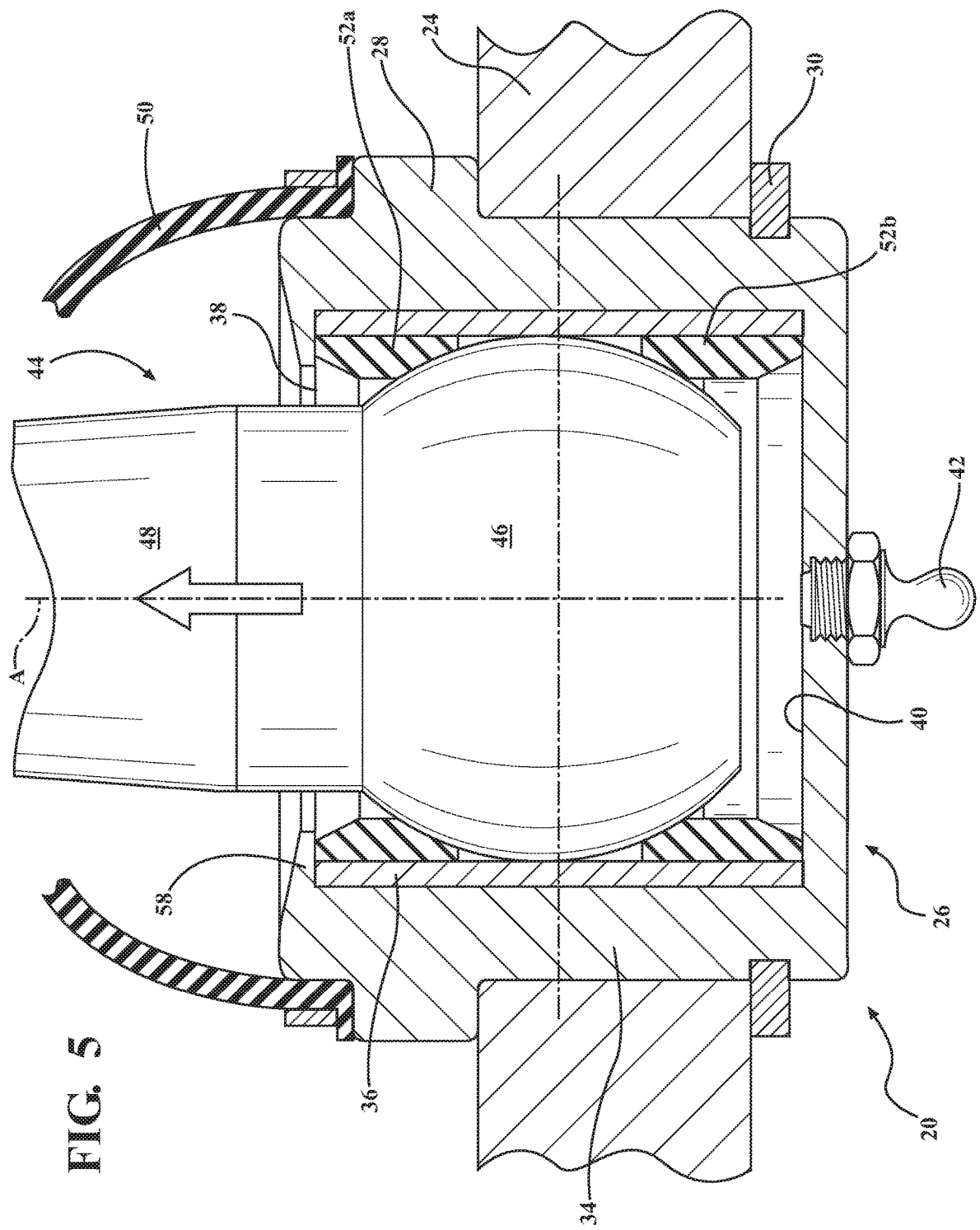
FIG. 5 is a view similar to FIG. 4 but showing a ball stud being moved relative to a housing in one axial direction.
Figure 6:
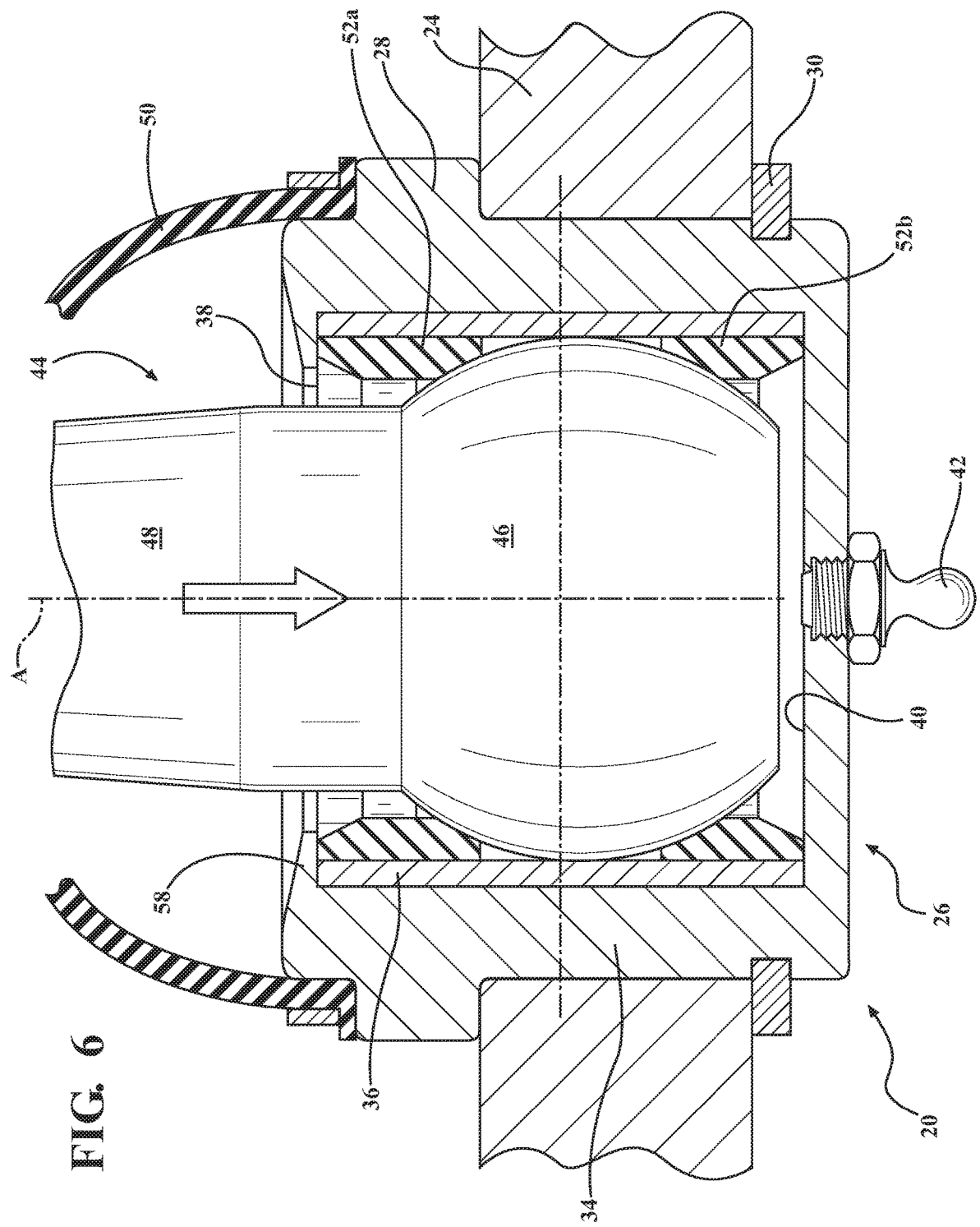
FIG. 6 is another view similar to FIG. 4 but showing the ball stud being moved relative to the housing in an opposite axial direction from FIG. 5.

During installation of the ball joint assembly 20 on a vehicle, the first and second preload members 52a, 52b allow for the ball stud 44 to move relative to the housing 26 along the central axis A with minimal impact on the torque required to articulate and rotate the ball stud 44. Thus, the ball joint assembly 20 is prevented from binding up, as can occur in other known ball joint assemblies where minimal or no axial movement of the ball stud is possible. For example, FIG. 5 shows the ball portion 46 of the ball stud 44 as having been moved in a closer to the open first end 38 of the housing 26. As shown, the first preload member 52a has been compressed as compared to FIG. 4. In FIG. 6 shows the ball portion 46 of the ball stud 44 as having been moved closer to the closed second end 40 of the housing 26. As shown, in this condition, it is the second preload member 52b that has been compressed.

An alternate embodiment of the ball joint assembly 120 is generally shown in FIG. 8 with like numerals, separated by a prefix of "1" indicating corresponding parts with the first exemplary embodiment. The second embodiment is distinguished from the first embodiment by the housing 126 being made as a monolithic piece of metal, such as gas carbonized AISI 1018 steel. The housing 126 of this alternate embodiment is open at both the first end 138 and the second end with a radially inwardly extending and machined (not swaged or otherwise deformed) lip 158 at the open first end 138 and with a circumferential groove formed into the inner wall adjacent the open second end. The preload members 152 and the ball portion 146 of the ball stud 144 are all inserted into the inner bore through the open second end. A cover plate 160, which starts with a frustoconical shape, is then flattened into engagement with the circumferential groove to close the second end of the housing 126 and capture the preload members 152 and ball portion 146 of the ball stud 144 in the inner bore.

Another aspect of the present invention is related to a method of making a ball joint assembly 20, such as the ball joint assembly 20 shown in FIGS. 2-6 and discussed above. The method includes the step of preparing the housing 26. The method continues with the step of inserting the second preload member 52b into the inner bore. The method proceeds with the step of inserting the ball portion 46 of the ball stud 44 into the inner bore. The method continues with the step of inserting the first preload member 52a into the inner bore. The method proceeds with the step of compressing at least one of the first and second preload members 52a, 52b to impart a biasing force on the ball portion 46 of the ball stud 44. The method continues with the step of closing the housing 26 to capture the first and second preload members 52a, 52b and the ball portion 46 of the ball stud 44 in the inner bore.

Preferably, the steps of compressing the first and second preload members 52a, 52b and of closing the housing 26 are simultaneous. For example, in one embodiment, the housing 26 is swaged to both capture the preload members 52a, 52b and the ball portion 46 of the ball stud 44 in the inner bore. In another embodiment, the cover plate 160 is pressed into engagement with a groove that is formed into the housing 126.

Obviously, many modifications and variations of the present invention are possible in light of the above teachings. It is, therefore, to be understood that within the scope of the appended claims, the invention may be practiced otherwise than specifically described. It should also be appreciated that the terms "upper", "lower" and "bottom" are in reference to the orientations of the enabling embodiment of the invention shown in the Figures and are not meant to require any certain orientation. Additionally, it is to be understood that all features of all claims and all embodiments can be combined with each other, as long as they do not contradict each other.

What is claimed is:

1. A ball joint assembly, comprising:
   a housing with an inner wall which surrounds an inner bore that extends along a central axis;
   a ball stud with a ball portion received in said inner bore of said housing and with a shank portion projecting out of said inner bore through an open end of said housing;
   first and second preload members disposed in said inner bore on opposite axial sides of said ball portion and in direct contact with said ball portion;
   each of said first and second preload members being made as a monolithic piece of an elastomeric material and being symmetrical about a circumferential midplane when in an uncompressed state; and
   at least one of said monolithic preload members being compressed between said ball portion and said housing to urge said ball portion to a central location.

2. The ball joint assembly as set forth in claim 1 wherein said first and second preload members are of identical construction.

3. The ball joint assembly as set forth in claim 2 wherein each of said preload members is annular in shape and circles said central axis.

4. The ball joint assembly as set forth in claim 3 wherein each of said preload members has a corrugated top with a plurality of peaks and a plurality of valleys and a corrugated bottom with a plurality of peaks and a plurality of valleys.

5. The ball joint assembly as set forth in claim 4 wherein, for each of said preload members, said peaks of said corrugated top are circumferentially aligned with said peaks of said corrugated bottom and said valleys of said corrugated top are circumferentially aligned with said valleys of said corrugated bottom.

6. The ball joint assembly as set forth in claim 1 wherein the housing is deformed to capture said ball portion of said ball stud and said preload members in said inner bore of said housing.

7. The ball joint assembly as set forth in claim 1 wherein each bearing has an inner surface with a top portion and a bottom portion and wherein the inner surface tapers radially outwardly in both of said top and bottom portions.

8. A ball joint assembly, comprising:
a housing with an inner wall which surrounds an inner bore that extends along a central axis;
a ball stud with a ball portion received in said inner bore of said housing and with a shank portion projecting out of said inner bore through an open end of said housing;
first and second preload members disposed in said inner bore on opposite axial sides of said ball portion and in contact with said ball portion;
said preload members being of an elastomeric material;
at least one of said preload members being compressed to urge said ball portion to a central location;
wherein said first and second preload members are of identical construction;
wherein each of said preload members is annular in shape and circles said central axis;
wherein each of said preload members has a corrugated top with a plurality of peaks and a plurality of valleys and a corrugated bottom with a plurality of peaks and a plurality of valleys;
wherein, for each of said preload members, said peaks of said corrugated top are circumferentially aligned with said peaks of said corrugated bottom and said valleys of said corrugated top are circumferentially aligned with said valleys of said corrugated bottom; and
wherein each of said preload members has an inner surface which faces towards said central axis and wherein said inner surface is tapered radially outwardly on said peaks.

9. A method of making a ball joint assembly, comprising the steps of:
preparing a housing which has an inner bore and at least one open end;
preparing a first preload member and a second preload member, each of the first and second preload members being made as a monolithic piece of an elastomeric material and being symmetrical about a circumferential midplane when in an uncompressed state;
inserting the first preload member into the inner bore;
inserting a ball portion of a ball stud into the inner bore and such that a shank portion of the ball stud extends out of the inner bore through the at least one open end;
inserting the second preload member, into the inner bore;
compressing at least one of the first and second preload members to between said ball portion and said housing and impart a biasing force on the ball portion of the ball stud; and
closing the housing to capture the first and second preload members and the ball portion of the ball stud in the inner bore.

10. The method as set forth in claim 9 wherein the steps of compressing the at least one of the first and second preload members is simultaneous to the step of closing the housing.

11. The method as set forth in claim 10 wherein the step of closing the housing to capture the first and second preload members and the ball portion of the ball stud in the inner bore includes swaging an end of the housing.

12. The method as set forth in claim 10 wherein the step of closing the housing to capture the first and second preload members and the ball portion of the ball stud in the inner bore includes engaging a cover plate with the housing.

13. The method as set forth in claim 9 wherein each of the first and second preload members is in direct contact with the ball portion of the ball stud.

14. The method as set forth in claim 9 wherein each of the preload members has a corrugated top and a corrugated bottom.

15. The method as set forth in claim 9 wherein each bearing has an inner surface with a top portion and a bottom portion and wherein the inner surface tapers radially outwardly in both of said top and bottom portions.

* * * * *